United States Patent
Peterson

(10) Patent No.: US 6,698,197 B1
(45) Date of Patent: Mar. 2, 2004

(54) HYDRAULICALLY ACTUATED BY-PASS VALVE

(75) Inventor: Craig L. Peterson, Waconia, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/306,647

(22) Filed: Nov. 26, 2002

(51) Int. Cl.[7] .............................................. F16D 31/02
(52) U.S. Cl. .............................. 60/464; 60/468; 60/488
(58) Field of Search ........................ 60/444, 464, 468, 60/487, 488

(56) References Cited

U.S. PATENT DOCUMENTS

| | | | |
|---|---|---|---|
| 4,696,162 A | * 9/1987 | Williams | 60/468 |
| 4,936,095 A | 6/1990 | Ross et al. | 60/444 |
| 5,265,422 A | * 11/1993 | Watts | 60/488 |
| 5,850,736 A | 12/1998 | Sakakura et al. | 60/464 |

* cited by examiner

Primary Examiner—Thomas E. Lazo
(74) Attorney, Agent, or Firm—L. J. Kasper

(57) ABSTRACT

A closed loop hydrostatic transmission including a pump (11) having a charge pump (23) and an assembly (25). The assembly (25) includes a pair of relief and check valve assemblies (65,67), and each one includes a check valve poppet (71) relatively fixed to a washer member (83) in the absence of high pressure. The washer member (83) moves within a bore to define a chamber (85) in which is the spring (87) biasing the check poppet (71) closed. A drain valve (97) has its inlet in fluid communication with the spring chambers (85), and in response to a predetermined input, such as an electrical input signal (101), the drain valve opens (FIG. 3), and drains the chambers (85). In this condition, both check poppets (71) open, and fluid can flow freely within the closed loop so that, for example, the vehicle may be towed a short distance, without overheating the fluid, and without the need to mechanically unseat the check valves as has been common practice.

2 Claims, 3 Drawing Sheets

HYDRAULICALLY ACTUATED BY-PASS VALVE

BACKGROUND OF THE DISCLOSURE

The present invention relates to hydrostatic transmission ("HST") systems and controls therefore, and more particularly, to closed loop hydrostatic transmission systems of the type including a charge pump which serves as the source of make-up fluid to the closed loop, and as the source of control fluid to the system controls.

However, it should be understood that the present invention may also be utilized advantageously in HST systems in which the pump is controlled by means other that hydraulically, by control pressure from a charge pump. For example, the invention would provide substantial benefit when used with a pump in which the angle of the swashplate is controlled manually by means of a mechanical handle. In a pump of this type, and as is well known to those skilled in the art, the pump still includes a charge pump, but the sole function of the charge pump on a mechanically actuated pump is to provide make-up fluid to the closed loop, to compensate for leakage.

A typical closed loop hydrostatic transmission system of the type to which the present invention relates is illustrated and described in U.S. Pat. No. 4,936,095, assigned to the assignee of the present invention and incorporated herein by reference. In such closed loop HST systems, the closed loop and the various system components are protected from excessive pressures by means of a pair of high pressure ("overpressure") relief valves, which are typically included in a valve assembly disposed in the pump end cover.

In addition, the typical closed loop HST system includes a bypass valve assembly which is capable of "cross porting" (or short-circuiting) the closed loop hydrostatic circuit. One of the primary uses of the bypass valve assembly arises whenever the vehicle is disabled and must be moved (such as by being towed) a short distance. The bypass valve assembly usually functions by means of some sort of mechanical device which may be actuated to push (lift) both of the check valves off of their respective check valve seats, thus allowing oil to flow freely from one side of the hydrostatic closed loop to the other side. In the condition described, the motor is then able to turn freely as the vehicle is being towed, without causing the fluid to overheat.

Although the above-described prior art arrangement for short-circuiting the hydrostatic closed loop has been functionally acceptable, the need to add some sort of mechanical structure to the bypass valve assembly, which is able to unseat both of the check valves, does add substantially to the complexity and cost of the bypass valve assembly, and of the overall HST system. Also, it is quite common that the pump of the HST system is "buried" deep within the vehicle, such that the vehicle operator does not really have access to the bypass valve assembly (also referred to sometimes as the "tow valve"). For such a vehicle, in the event that the vehicle needs to be towed, there may have to be some disassembly of the vehicle, in order for the operator to have access to the mechanical device for cross-porting the bypass valve assembly. Such partial disassembly would add substantially to the overall cost and inconvenience of the vehicle down-time.

In addition, those skilled in the art of closed loop HST control systems have become aware of various other operating situations in which it would be desirable to short circuit the hydrostatic closed loop, but wherein actuation of the mechanical device for unseating the check valves would not be feasible. For example, whenever the vehicle operator applies the vehicle brakes, it would be desirable to ensure that the motor is not being positively driven by pressurized fluid from the pump. It has been common practice on vehicles propelled by HST systems to provide a parking brake having a "load holding" torque greater than the torque output of the HST system, just to make sure that the vehicle can't "drive through" the vehicle parking brake. Such a large capacity parking brake adds to the overall cost of the vehicle, without any added benefit.

On servo pumps (i.e., those on which the pump displacement is controlled hydraulically), one of the solutions used to prevent driving through the parking brake is to add a special valve which, whenever the vehicle parking brake is applied, will be actuated to block communication of control pressure from the charge pump to the servo control device. This solution is generally functionally acceptable, but adds to the cost and complexity of the pump and the controls, especially because there would now be the need for interconnection between the parking brakes and the pump controls, for no purpose other than to prevent the "driving-through-the-brakes" problem.

Another situation in which it is desirable to short-circuit the hydrostatic closed loop, and an example of a situation which is an issue of safety, is the situation in which the vehicle operator is not present in the operator seat (as is typically determined by some sort of electrical seat sensor). On many vehicles, an electrical signal indicating the absence of the vehicle operator from the operator's seat is used to take some safety-related action, such as not permitting operation of the engine ignition system, or in the case of an HST having electronic pump controls, not permitting the pump swashplate to move from its normal, zero-swash position to a displaced position. Prior to the present invention, there would have been a need for some arrangement to destroke the pump, in response to the safety issue, in addition to whatever structure was required to deal with the parking brake issue discussed previously.

BRIEF SUMMARY OF THE INVENTION

Accordingly, it is an object of the present invention to provide an improved closed loop hydrostatic transmission and control system which overcomes the disadvantages of the prior art mechanical arrangement for unseating the check valves to short-circuit the hydrostatic closed loop.

It is another object of the present invention to provide an improved closed loop hydrostatic transmission and control system in which it is possible to achieve the desired short-circuiting of the hydrostatic closed loop in response to an electrical signal.

It is still another object of the present invention to provide an improved method of controlling a closed loop hydrostatic transmission system in which the hydrostatic closed loop may be short-circuited in response to an electrical input signal generated as the result of the occurrence of any one or more predetermined vehicle conditions.

It is yet another object of the present invention to provide an improved method of controlling a closed loop hydrostatic transmission system, which accomplishes the above-stated objects, and which, on many vehicles, makes it possible to utilize a lower torque capacity parking brake.

The above and other objects of the invention are accomplished by the provision of an improved closed loop hydrostatic transmission system including a pump adapted to supply pressurized fluid, a motor adapted to receive the pressurized fluid, and high pressure and low pressure conduits for communicating fluid between the pump and the motor. A source of relatively low pressure make-up fluid is adapted for fluid communication with the low pressure conduit. A relief and check valve assembly is disposed between the source of make-up fluid and the high pressure conduit. The assembly includes a relief valve member operable, in the presence of fluid pressure in the high pressure conduit in excess of predetermined maximum pressure to be biased open in opposition to the biasing force of a relief spring to permit fluid communication from the high pressure conduit to the low pressure conduit. The assembly includes a check valve member operable, in the presence of fluid pressure in the high pressure conduit which is less than the pressure of the relatively low pressure make-up fluid, to be biased open, in opposition to the biasing force of a check spring, to permit fluid communication from the source of make-up fluid to the high pressure conduit.

The improved closed loop hydrostatic transmission is characterized by the check spring being disposed in a spring chamber bounded on one side by a member which is substantially fixed relative to the check valve member in the absence of relatively high pressure in the high pressure conduit. A normally closed drain valve has an inlet in fluid communication with the spring chamber, and an outlet in fluid communication with the system reservoir. In response to a predetermined input, the drain valve will move from its normally closed condition to an open condition, draining the spring chamber to the system reservoir, and causing the check valve member to open under the influence of the relatively low pressure make-up fluid.

In accordance with another aspect of the invention, an improved method of controlling a closed loop hydrostatic transmission is provided wherein the transmission is as described previously. The relief and check valve assembly is disposed between the source of make-up fluid and the high pressure conduit and includes a first check valve member operable in the presence of fluid pressure in the high pressure conduit which is less than the pressure of the make-up fluid, to be biased open in opposition to the force of a first check spring. The assembly further includes a second check valve member operable, in the presence of fluid pressure in the low pressure conduit which is less than the pressure of the make-up fluid, to be biased open in opposition to the biasing force of a second check spring. The method of controlling comprises the step of sensing the existence of a predetermined vehicle condition and generating an electrical signal representative of the condition.

The improved method of controlling a closed loop hydrostatic transmission is characterized by disposing the first and second check springs in first and second spring chambers, respectively, the chambers being bounded on one side by first and second members, respectively, which are substantially fixed relative to the first and second check valve members, respectively, in the absence of relatively high pressure in the high pressure and low pressure conduits. The method includes providing a normally closed electromagnetically actuated drain valve having an inlet in fluid communication with both of the first and second spring chambers, and an outlet in fluid communication with the system reservoir. Finally, the method includes transmitting to the drain valve the electrical signal to move the drain valve from its normally closed condition to an open condition, draining the spring chamber to the reservoir and opening both of the first and second check valve members, thereby permitting relatively unrestricted fluid communication between the high pressure and low pressure conduits.

DETAILED DESCRIPTION OF THE PREFERRED EMBODIMENT

Figure 1:
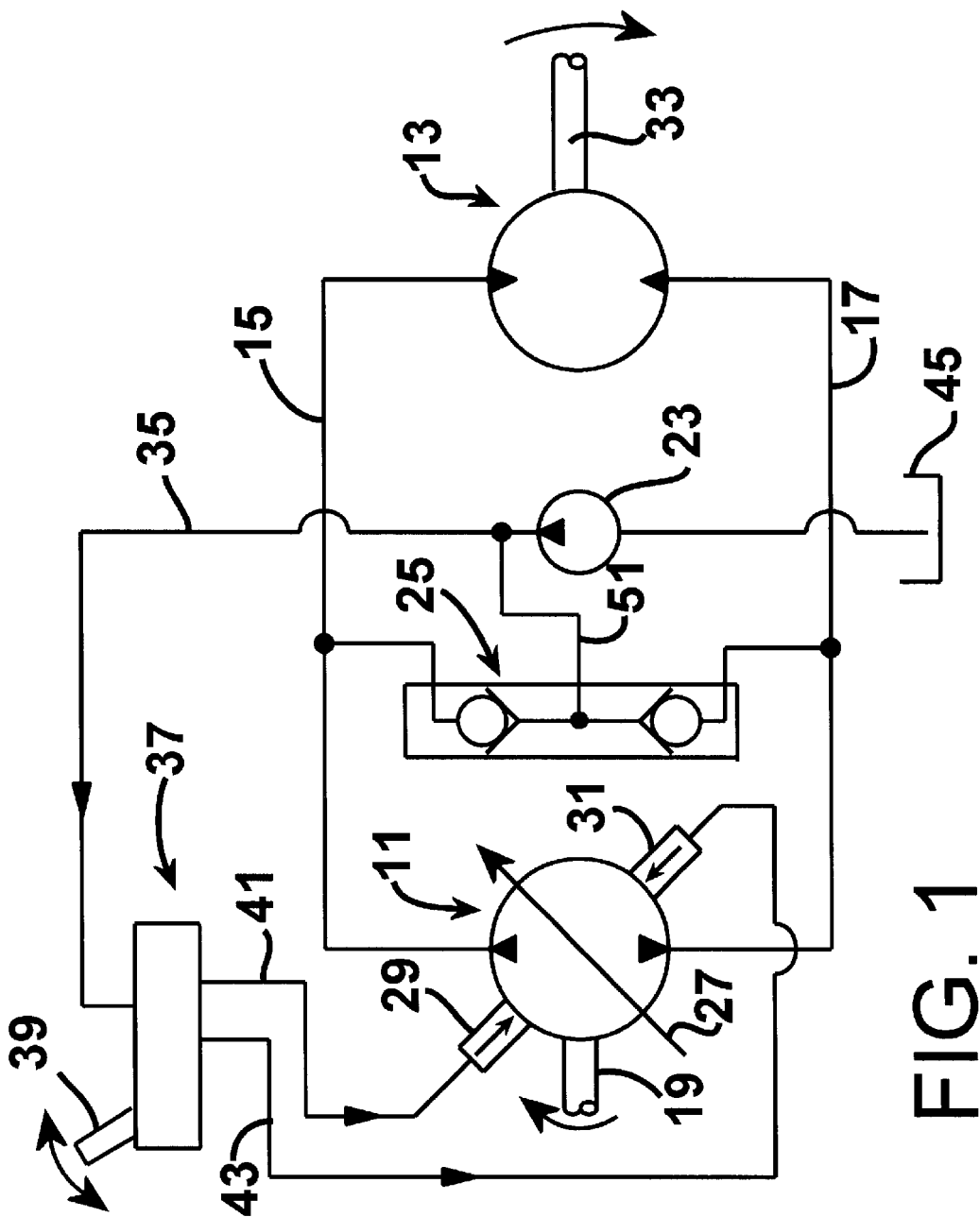
FIG. 1 is a hydraulic schematic of a closed loop hydrostatic transmission and control system of the type to which the present invention relates.

Referring now to the drawings, which are not intended to limit the invention, FIG. 1 illustrates the typical closed loop hydrostatic transmission of the type to which the present invention relates. The system of FIG. 1 includes, by way of example only, a variable displacement axial piston pump, generally designated 11, which is hydraulically coupled to a fixed displacement, axial piston motor 13 by means of a pair of fluid conduits 15 and 17. The pump 11 may be of a well-known type, including an input shaft 19, which drives the rotating group of the pump 11, in a manner which is well known to those skilled in the art, and also drives a charge pump 23. Typically, the output of the charge pump is the sole source for make-up fluid to either fluid conduit 15, or fluid conduit 17, whichever contains fluid at a pressure below the output pressure of the charge pump 23. As is well known to those skilled in the art, the output pressure of the charge pump (also frequently referred to as "control pressure") is typically in the range of about 150 psi to about 350 psi. Communication of make-up fluid from the charge pump 23 to either of the fluid conduits 15 or 17 is through a relief and check valve assembly, generally designated 25.

The pump 11 further includes a swashplate 27 which is pivotable, to vary the displacement (fluid output volume per revolution of the input shaft 19) of the pump 11, by means of a pair of stroking cylinders 29 and 31, as is generally well known in the art. The motor 13 includes an output shaft 33, which is connected to drive a load (not shown herein), such as a driven wheel used to propel the vehicle on which the HST system is located and operating.

The output of the charge pump 23, in addition to being directed to one of the fluid conduits 15 or 17 as make-up fluid, is also communicated by means of a conduit 35 to a control mechanism, generally designated 37. It should be understood by those skilled in the art that, for purposes of the present invention, the control mechanism 37 may be any one of the conventional, well known mechanisms by means of which movement of a control handle 39 (or some other suitable "input") is able to communicate the "control pressure" in the conduit 35 to either a conduit 41 or a conduit 43. As may be seen in FIG. 1, and as is well known in the art, the conduit 41 is connected to the stroking cylinder 29, whereas the conduit 43 is connected to the stroking cylinder 31. Thus, movement of the control handle 39 from a neutral position in either a forward or reverse direction communicates control pressure to either the conduit 41 or the conduit 43, to displace the swashplate 27 toward either a forward or reverse direction, respectively, thus communicating pressurized fluid from the pump 11 to either the fluid conduit 15 or the fluid conduit 17, respectively, which drives the motor 13 and the output shaft 33 in either the forward (see arrow) or reverse direction, respectively.

The hydrostatic transmission system illustrated in FIG. 1 is of the type referred to as a "closed loop" system, primarily because, assuming forward direction of operation, the fluid conduit 15 communicates pump output pressure to the inlet of the motor 13, and the fluid conduit 17 communicates low pressure return fluid from the outlet of the motor 13 to the inlet of the pump 11. The system also includes a fluid reservoir 45, but in a closed loop system, only leakage fluid (such as from the case of the pump 11 and motor 13) is communicated to the fluid reservoir 45. The fluid output of the charge pump 23 (make-up fluid) thus makes up for any leakage lost from the system to the reservoir 45.

Figure 2:
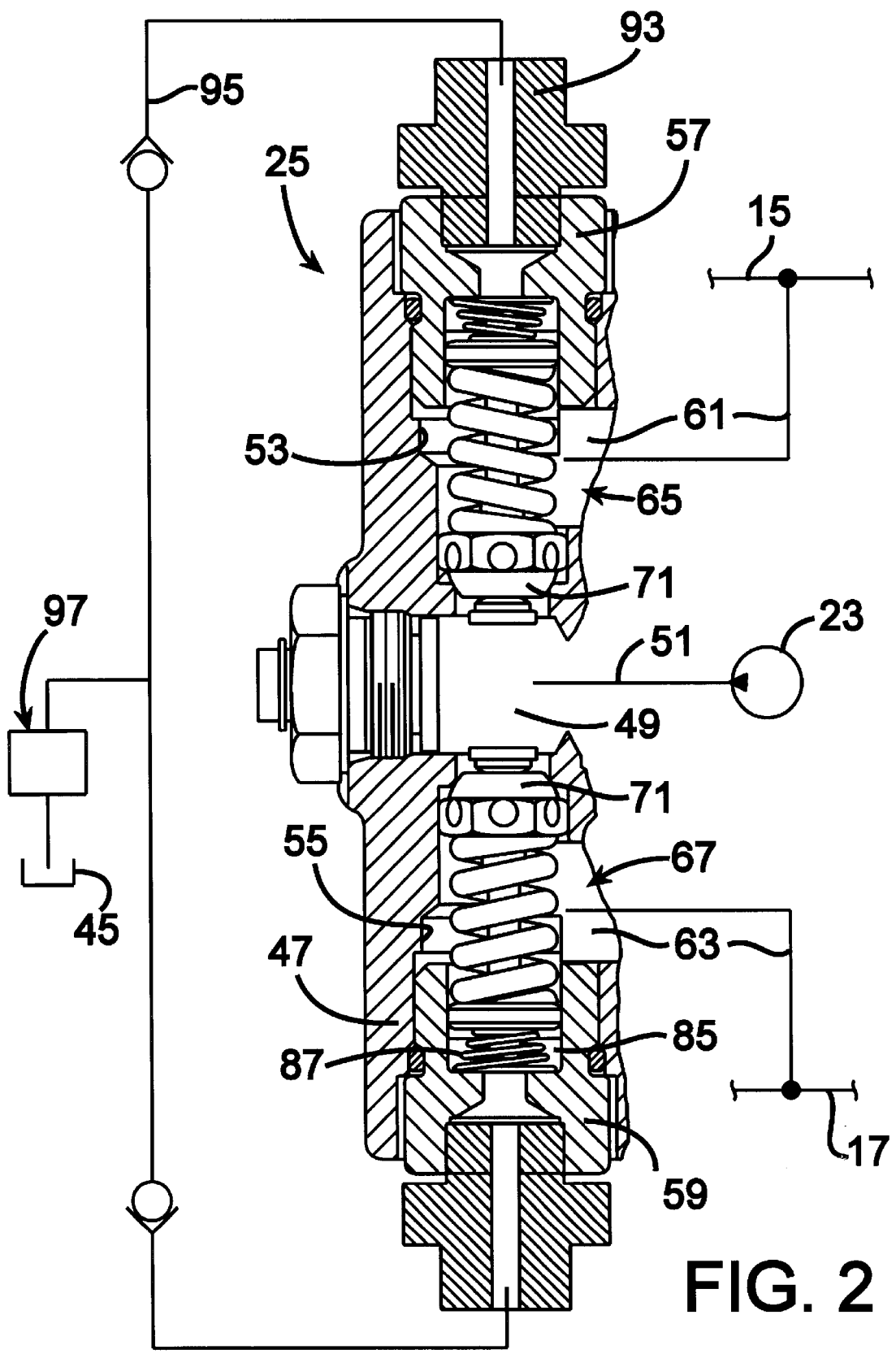
FIG. 2 is an illustration, partly in schematic and partly in cross-section, of a relief and check valve assembly incorporating the present invention.

Referring now primarily to FIG. 2, there will be a further description of the relief and check valve assembly 25 which, in the subject embodiment, and by way of example only, is disposed in an end cover 47 of the pump 11. The end cover 47 defines a charge cavity 49 which is in fluid communication with the outlet of the charge pump 23 by means of a fluid conduit 51. The end cover 47 also defines a pair of stepped, internally threaded bores 53 and 55, which are sealed at their outer ends by means of threaded plugs 57 and 59, respectively. It should be understood that, prior to the present invention, the threaded plugs 57 and 59 were merely solid plugs, not having therein any sort of opening or fluid passage of the type shown in FIGS. 2 and 3, and to be described further hereinafter. The bore 53 is in fluid communication with the fluid conduit 15 by means of a fluid passage 61 (which is shown both schematically and in cross-section in FIG. 2). Similarly, the bore 55 is in fluid communication with fluid conduit 17 by means of a fluid passage 63 (which is also shown both schematically and in cross-section in FIG. 2).

Disposed within the bore 53, and guided within the plug 57 is a relief and check valve assembly, generally designated 65, and disposed within the bore 55 and guided within the plug 59 is a relief and check valve assembly, generally designated 67. Except as will be described hereinafter, each of the relief and check valve assemblies 65 and 67 may be made substantially as shown in above-incorporated U.S. Pat. No. 4,936,095, although the construction features and details shown in the incorporated patent are not essential to the present invention, except to the extent specifically recited in the appended claims.

Figure 3:
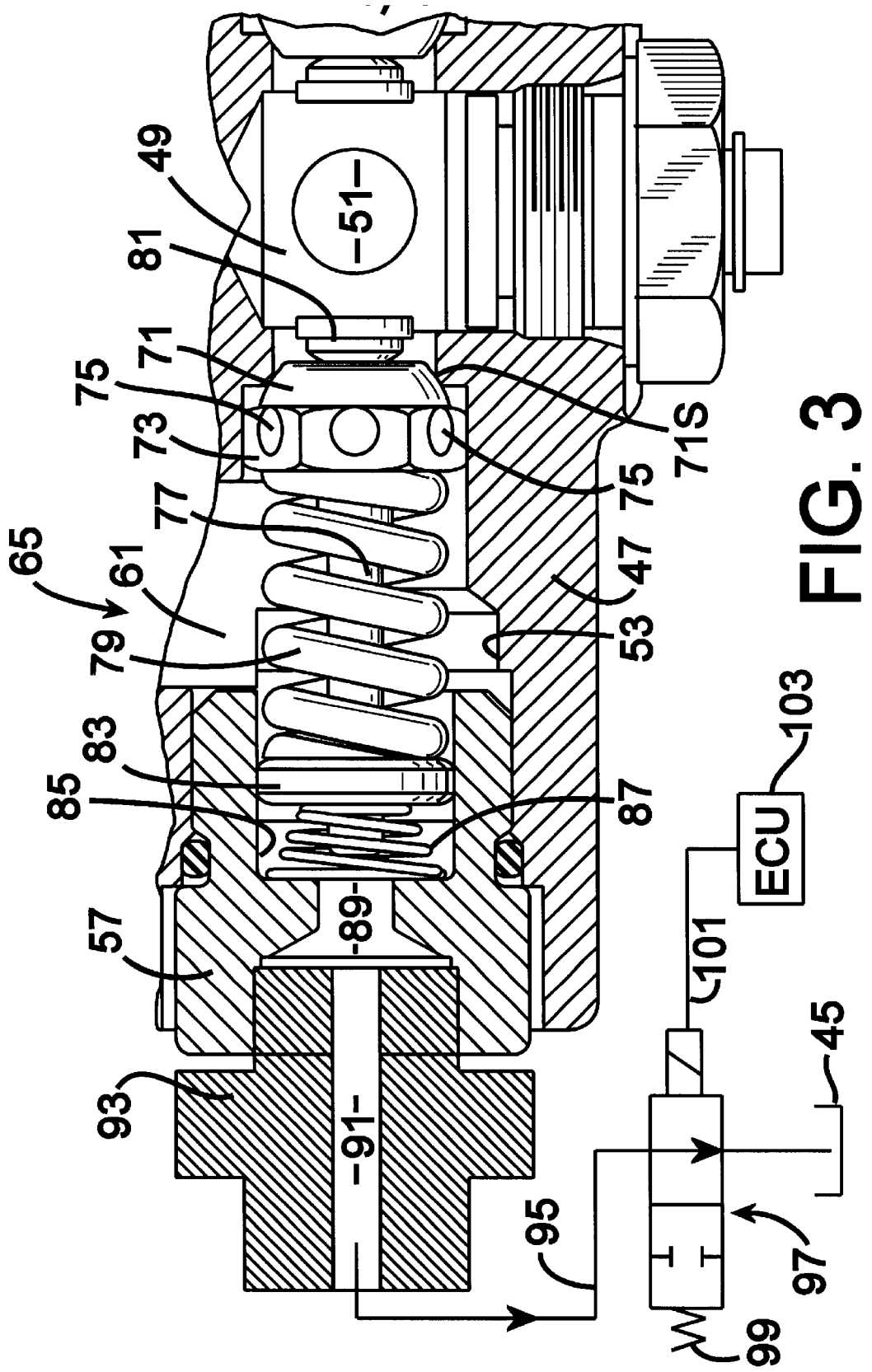
FIG. 3 is an enlarged, fragmentary, axial cross-section, similar to FIG. 2, illustrating the present invention in greater detail.

Referring now primarily to FIG. 3, in conjunction with FIG. 2, the relief and check valve assembly 65 will be described in further detail, it being understood that assembly 67 is substantially identical to the assembly 65, and is simply arranged in a "mirror image", relative to the assembly 65, about the central charge cavity 49. The relief and check valve assembly 65 includes a seat member 71, which also serves as a "check valve poppet" as will be described further subsequently, and which, when appropriate, is referred to as the "check valve poppet 71". The seat member 71 defines a plurality of flats 73 (or notches, or any other structure permitting fluid communication). Seat member 71 further defines a plurality of radial passages 75 providing communication from each of the respective flats 73 to the interior of the seat member 71.

Disposed within the seat member 71 is a poppet assembly including a poppet stem 77 (which is partially hidden in FIG. 3 within a helical compression spring 79). The poppet stem 77 extends axially through the interior of the seat member 71, defining an annular chamber therebetween (as is shown in the incorporated patent), and it is this annular chamber into which the radial passages 75 open. Attached to the poppet stem 77 is a relief poppet 81, which is normally disposed against ("normally closed") a relief seat defined by the seat member 71, and projects axially somewhat into the charge cavity 49. Fixed to the left end (in FIG. 3) of the poppet stem 77 is the relatively large, circular washer member 83, against which the left end of the compression spring 79 is seated.

For purposes of the present invention, it is fairly important that the threaded plug 57 define a generally cylindrical bore 85, and that the washer member 83 have a relatively close fit within the bore 85, for reasons which will become apparent subsequently. Thus, the bore 85 and the washer member 83 cooperate to define a chamber, which hereinafter will also bear the reference numeral "85". Disposed within the bore 85 is a relatively light compression spring 87, which permits the entire assembly 65 to serve as a check valve, as will be described in greater detail subsequently. As is now well known to those skilled in the art, the fit of the washer member 83 within the bore 85 should be such that the clearance therebetween serves to "dampen" movement of the relief poppet 81 and the poppet stem 77, which are fixed to move with the washer member 83. Thus, one purpose of the washer member 83 is to provide sufficient damping to prevent the relief poppet 81 from going unstable.

As is also well known to those skilled in the art, and from a reading and understanding of the above-incorporated patent, the spring rate of the compression spring 79 determines the relief setting of the assembly 65 and the spring rate of the compression spring 87 determines the check valve setting of the assembly 65. For example, the spring 79 may provide a relief setting of 6000 psi such that, if the pressure in the fluid conduit 15 exceeds 6000 psi, that pressure will also be present in the fluid passage 61 and the pressurized fluid will flow along the flats 73 then radially inward through the radial passages 75 and exert a biasing force on the relief poppet 81 sufficient to bias the relief poppet 81 to the right in FIG. 3, moving the poppet stem 77 and the washer member 83 with the relief poppet 81. This rightward movement of the relief poppet 81 and the poppet stem 77 and washer member 83 compresses the compression spring 79, which has its right end seated against the "rearward" surface of the seat member 71. Thus, the pressurized fluid is able to flow from the fluid passage 61, past the relief poppet 81 into the charge cavity 49, from where it will unseat the check valve portion of the relief and check valve assembly 67, thus permitting flow from the charge cavity 49 to the fluid passage 63, and from there to the fluid conduit 17. During normal operation of the HST system, the flow described above would correspond to excess pressure flowing from the high pressure conduit 15 to the low pressure conduit 17.

The HST system has been described up to this point with the fluid conduit 15 being the high pressure conduit and the fluid conduit 17 being the low pressure conduit, but it will be understood by those skilled in the art that hereinafter, and in the appended claims, either conduit 15 or 17 can comprise, at various times, either the high pressure conduit or the low pressure conduit, depending upon factors such as the direction in which the swashplate 27 has been stroked, and whether the vehicle is being propelled by the HST system (in which case pump 11 acts as a pump), or whether the vehicle is coasting (in which case the motor 13 is acting as a pump, and the pump 11 is acting as a motor). Therefore, as used hereinafter, and in the appended claims, terms such as "high pressure conduit" and "low pressure conduit" will be understood to refer, respectively, to those conduits (15 and 17, respectively) which comprise the high pressure and low pressure conduits when the vehicle is operating under normal propel conditions, and moving in a normal, forward direction. These terms, and terms of similar import, will be understood not to define any particular pressure condition, existing in the particular conduit, at any particular point in time.

Referring still to FIG. 3, if the pressure in the fluid conduit 15 suddenly drops below "charge pressure", i.e., below the output pressure of the charge pump 23, the assembly 65 will now act as a check valve. In this mode of operation, the fluid pressure in the charge cavity 49 will exert sufficient force on the seat member 71, thus biasing the assembly 65 to the left in FIG. 3, in opposition to the biasing force of the compression spring 87. It should be noted that, in the check valve mode of operation, there is no compression of the spring 79, such that the check valve poppet (seat member 71) and the poppet stem 77, spring 79 and washer member 83 all move together as a unit. In other words, the washer member 83 comprises a member which is substantially "fixed" relative to the check valve poppet 71 in the absence of relatively high pressure in the high pressure fluid conduit 15. Thus, as the check valve poppet 71 lifts from its seat (moves left in FIG. 3) there will be a certain amount of flow from the charge cavity 49 past the check valve poppet 71, then through the fluid passage 61 to the fluid conduit 15, thus bringing the pressure in the conduit 15 back up to control pressure or charge pressure.

In the event that there is a loss of engine power, there will be no input drive torque to either the pump 11 or the charge pump 23. When such occurs (such as when the vehicle is being towed), the motor 13 becomes, functionally, the "pump" within the closed loop, in which case there will still be high pressure in the conduit 15 and in the fluid passage 61. Therefore, the area of the washer member 83, exposed to the high pressure in the fluid passage 61, must be greater than the "net" area of the seat member 71 exposed to the high pressure, in order that the net force on the relief and check valve assembly 65 will be in a direction tending to open the check function (i.e., open the seat member 71 by moving it to the left in FIG. 3, as described previously).

In accordance with an important aspect of the present invention, the threaded plug 57 defines an opening 89 which provides fluid communication from the chamber 85 to a bore 91 defined by a fitting 93, the bore 91 being communicated by means of a fluid passage 95 to the inlet of a drain valve 97. Preferably, the drain valve 97 is a two-position, two-way valve which may be biased by spring 99 toward a closed position, blocking fluid communication from the fluid passage 95 to the system reservoir 45. Preferably, the drain valve 97 is an electromagnetically operated valve (such as by means of a solenoid), which receives an electrical input signal 101 from a vehicle electronic control unit (ECU) 103. As will be understood by those skilled in the art, the appropriate input signal 101 is provided to the drain valve 97, to move it to the open position shown in FIG. 3, only in response to the existence of a predetermined vehicle condition.

In operation, when a predetermined vehicle condition occurs, such as the selection by the vehicle operator of a "towing mode" of operation, or the application of the vehicle brakes, or the absence of the operator from the operator's seat, etc., an appropriate electrical input signal 101 is communicated to the drain valve 97, biasing the drain valve 97 to the open position shown in FIG. 3. In the case of most of the vehicle conditions described above, the "loop pressure", i.e., the pressure in each of the fluid conduits 15 and 17, would be equal to at least charge pressure (e.g., about 150 to about 350 psi.), and could be substantially higher. Therefore, as the drain valve 97 opens, draining the chamber 85, there will now be a pressure differential acting on the washer member 83, tending to bias it to the left in FIG. 3. With the check valve poppet 71 being "fixed" relative to the washer member 83, as described previously, such leftward movement of the washer member 83 results in the check valve poppet 71 also moving to the left in FIG. 3, off of its seat 71S (see FIG. 3), defined by the end cover 47 between the charge cavity 49 and the threaded bore 53.

Referring again primarily to FIG. 2, in conjunction with FIG. 3, in order to accomplish the purposes of the present invention, both of the relief and check valve assemblies 65 and 67 are modified as described above. Therefore, when the predetermined vehicle condition occurs, and the appropriate signal 101 is sent to the drain valve 97, both of the chambers 85 are drained to the system reservoir 45, and both of the check valve poppets 71 open, as described previously. With both check valve poppets 71 open, there is now relatively unrestricted fluid communication between the fluid conduits 15 and 17, by means of the fluid passages 61 and 63 and the charge cavity 49. In the above condition, the vehicle can be towed, with fluid readily recirculating through the hydrostatic closed loop, and with relatively little resistance to flow.

If the vehicle operator has just applied the vehicle brakes, the cross-porting of the closed loop, as described above, insures that the vehicle is not being actively propelled by the HST at the same time that the operator has applied the vehicle parking brakes. As was mentioned previously, this aspect of the present invention means that, on many vehicles, it may be feasible to select a vehicle parking brake arrangement having a smaller load holding (torque) capacity than would have been possible prior to this invention, thus reducing the cost of the parking brake arrangement.

It should be apparent to those skilled in the art of vehicle control systems that, for many applications of the present invention, the transmittal of the electrical input signal 101 to the drain valve 97, to open the valve 97, may need to be coordinated ("timed") with the actuation of various other vehicle functions. For example, if the vehicle parking brake is applied as the result of the operator actuating an electrical switch (which both initiates the application of the brake and actuates the drain valve 97), if may be necessary to build a short (about 1 second) time delay into the ECU which generates the signal 101. As a result, the brake will have time to become applied before the drain valve 97 is opened, to thus prevent allowing the vehicle to be in a free-wheel mode temporarily.

In certain vehicle applications for the present invention, if some function such as periodic towing of the vehicle is the only intended use of the arrangement described above, the drain valve 97 could be operated other than by the electrical input signal 101. For example, if the arrangement of the invention were to be used only when there is an "Engine-OFF" condition (in which case there is no electric or hydraulic power on the vehicle), the drain valve 97 could be of the type which may be actuated mechanically (manually) to the open position shown in FIG. 3.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. In a closed loop hydrostatic transmission including a pump adapted to supply pressurized fluid, a motor adapted to receive said pressurized fluid, and high pressure and low pressure conduits for communicating fluid between said pump and said motor; a source of relatively low pressure make-up fluid adapted for fluid communication with said low pressure conduit; a relief and check valve assembly disposed between said source of make-up fluid and said high pressure conduit; said assembly including a relief valve member operable, in the presence of fluid pressure in said high pressure conduit in excess of a predetermined maximum pressure to be biased open, in opposition to the biasing force of a relief spring, to permit fluid communication from said high pressure conduit to said low pressure conduit; and said assembly including a check valve member operable, in the presence of fluid pressure in said high pressure conduit which is less than the pressure of said relatively low pressure make-up fluid, to be biased open, in opposition to the biasing force of a check spring, to permit fluid communication from said source of make-up fluid to said high pressure conduit; characterized by:

(a) said check spring being disposed in a spring chamber bounded on one side by a member which is substantially fixed relative to said check valve member in the absence of relatively high pressure in said high pressure conduit;

(b) a normally-closed drain valve having an inlet in fluid communication with said spring chamber, and an outlet in fluid communication with a system reservoir; and (c) wherein, in response to a predetermined input, said drain valve will move from its normally-closed condition to an open condition, draining said spring chamber to said system reservoir, and causing said check valve member to open under the influence of said relatively low pressure make-up fluid.

2. A method of controlling a closed loop hydrostatic transmission including a pump adapted to supply pressurized fluid, a motor adapted to receive said pressurized fluid, and high pressure and low pressure conduits for communicating fluid between said pump and said motor; a source of relatively low pressure make-up fluid adapted for fluid communication with said low pressure conduit; a relief and check valve assembly disposed between said source of make-up fluid and said high pressure conduit; said assembly including a first check valve member operable, in the presence of fluid pressure in said high pressure conduit which is less than the pressure of said make-up fluid, to be biased open in opposition to the biasing force of a first check spring, and further including a second check valve member operable, in the presence of fluid pressure in said low pressure conduit which is less than the pressure of said make-up fluid, to be biased open in opposition to the biasing force of a second check spring; said method of controlling comprising the step of sensing the existence of a predetermined vehicle condition and generating an electrical signal representative of said condition; said method being characterized by:

(a) disposing said first and second check springs in first and second spring chambers, respectively, said chambers being bounded on one side by first and second members, respectively, which are substantially fixed relative to said first and second check valve members, respectively, in the absence of relatively high pressure in said high pressure and low pressure conduits;

(b) providing a normally-closed electro-magnetically actuated drain valve having an inlet in fluid communication with both of said first and second spring chambers, and an outlet in fluid communication with a system reservoir;

(c) transmitting to said drain valve said electrical signal to move said drain valve from its normally-closed condition to an open condition, draining said spring chambers to said reservoir and opening both of said first and second check valve members, thereby permitting relatively unrestricted fluid communication between said high pressure and low pressure conduits.

* * * * *